(12) United States Patent
Pence

(10) Patent No.: US 7,252,343 B1
(45) Date of Patent: Aug. 7, 2007

(54) PORTABLE CHILD SEAT DEMONSTRATION DEVICE

(75) Inventor: Jeffrey Lee Pence, South Vienna, OH (US)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 11/191,226

(22) Filed: Jul. 27, 2005

(51) Int. Cl.
*B60N 2/28* (2006.01)
*A47D 15/00* (2006.01)
*A62B 35/00* (2006.01)
*B60R 21/00* (2006.01)
*B60R 22/00* (2006.01)

(52) U.S. Cl. .................... 297/483; 297/253; 297/254; 280/805; 280/806

(58) Field of Classification Search ............... 297/483, 297/253, 254
See application file for complete search history.

(56) References Cited

U.S. PATENT DOCUMENTS

| | | | |
|---|---|---|---|
| 2,574,743 A | 11/1951 | King | |
| 4,455,046 A | 6/1984 | Linderoth | |
| 4,728,119 A | 3/1988 | Sigafoo | |
| 4,750,783 A | 6/1988 | Irby et al. | |
| 4,874,203 A | 10/1989 | Henley | |
| 5,058,244 A * | 10/1991 | Fernandez | 24/170 |
| 5,265,931 A | 11/1993 | Ryan | |
| 5,383,708 A | 1/1995 | Nagasaka et al. | |
| 5,531,479 A * | 7/1996 | Bauer | 280/806 |
| 5,544,918 A * | 8/1996 | Fleming et al. | 280/805 |
| 5,566,978 A * | 10/1996 | Fleming et al. | 280/801.2 |
| 5,567,007 A | 10/1996 | Czernakowski et al. | |
| 5,615,917 A * | 4/1997 | Bauer | 280/806 |
| 5,732,974 A * | 3/1998 | Sayles | 280/805 |
| 5,873,599 A * | 2/1999 | Bauer et al. | 280/806 |
| 5,947,555 A | 9/1999 | Welsh, Jr. et al. | |
| 6,032,982 A * | 3/2000 | Pakulsky et al. | 280/805 |
| 6,039,353 A * | 3/2000 | Bauer et al. | 280/806 |
| 6,123,391 A * | 9/2000 | Boelstler et al. | 297/438 X |
| 6,213,512 B1 * | 4/2001 | Swann et al. | 280/806 |
| 6,554,357 B2 * | 4/2003 | Moffa | 297/253 |
| 6,749,150 B2 * | 6/2004 | Kohlndorfer et al. | 242/615.2 |
| 6,749,260 B2 | 6/2004 | Abel | |
| 7,090,304 B2 * | 8/2006 | Delventhal et al. | 297/478 |
| 2003/0222489 A1 * | 12/2003 | Takedomi et al. | 297/216.1 |
| 2007/0001495 A1 * | 1/2007 | Boyle et al. | 297/253 |

\* cited by examiner

*Primary Examiner*—Rodney B. White
(74) *Attorney, Agent, or Firm*—Rankin, Hill, Porter & Clark LLP; Vincent Ciamacco

(57) ABSTRACT

A demonstration seat assembly includes a frame on which a demonstration vehicle seat is supported, and a plurality of seat belt assemblies and child seat securing structures. The seat belt assemblies include a lap belt assembly, a lap/shoulder belt assembly, and a plurality of anchorage points adapted to receive tethers or a fixed anchoring latch assembly provided by one or more types of child safety seats. The lap belt assembly includes an emergency locking retractor that is secured to the frame on a first side of the vehicle seat, while the lap/shoulder belt assembly includes a switchable locking retractor that is secured to an upstanding support bar provided by the frame on the first side of the vehicle seat. The anchorage points include first and second lateral anchorage points that are accessible on a front side of the demonstration vehicle seat at a location between the seat cushion and seat back, as well as a center anchorage point that is accessible at a rear side of the vehicle seat. The frame includes a base assembly to which a plurality of wheels are secured to permit the demonstration seat assembly to be conveniently transported.

10 Claims, 6 Drawing Sheets

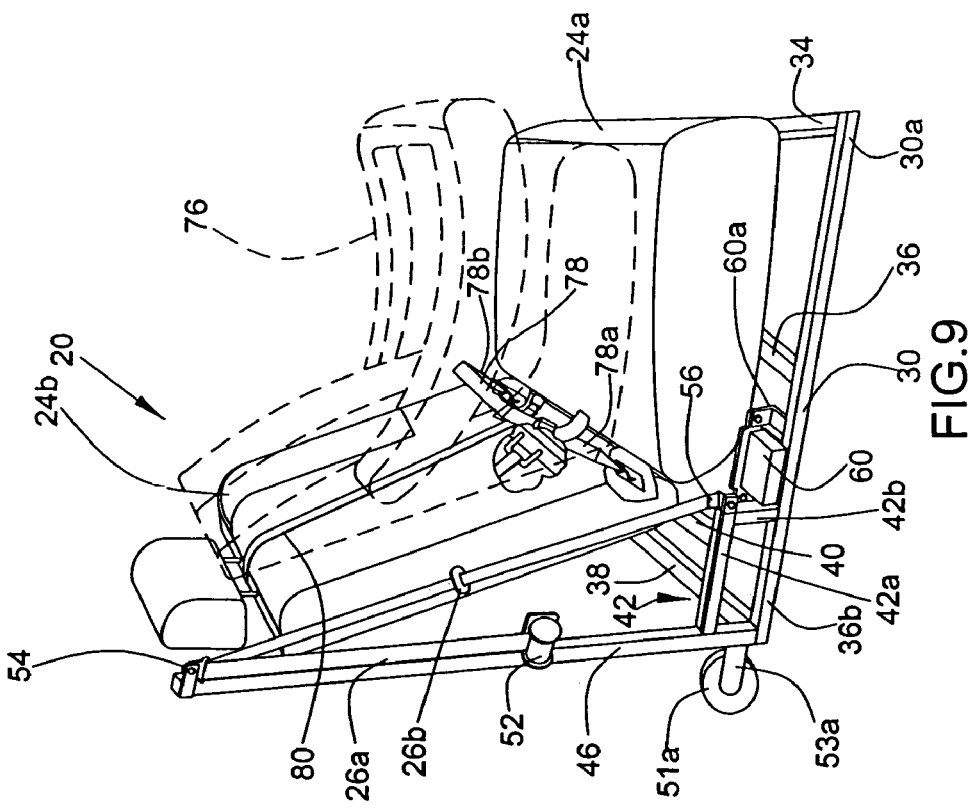
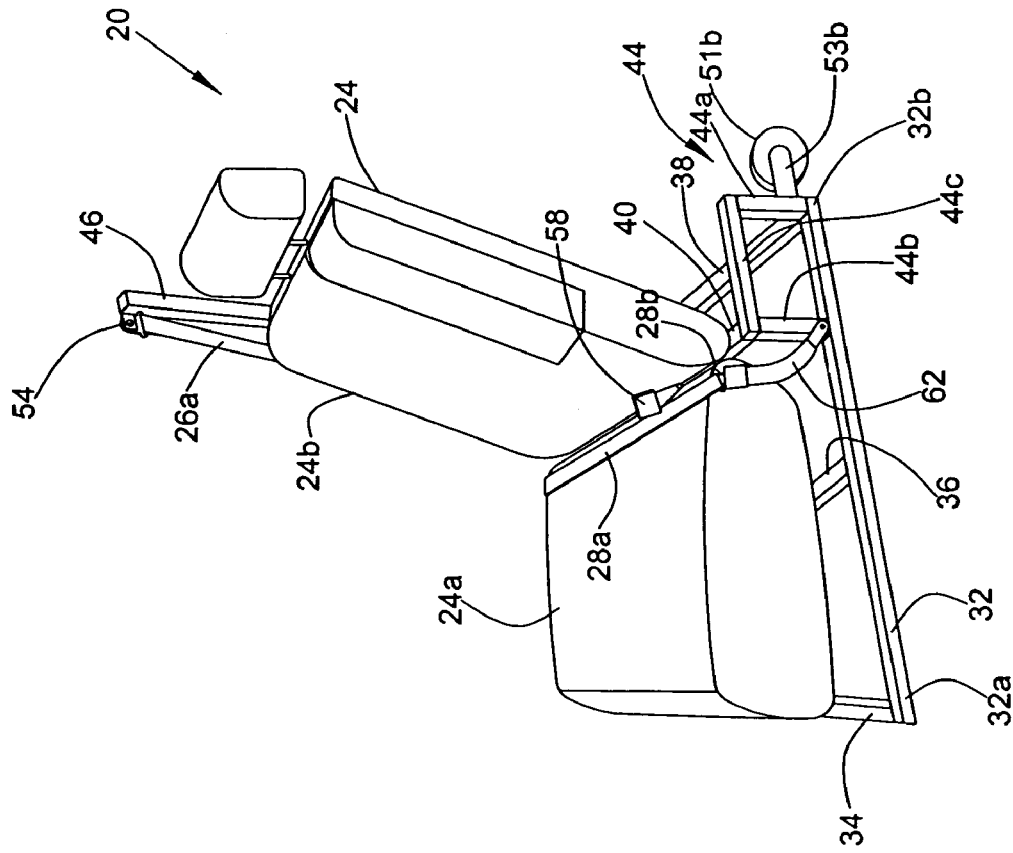

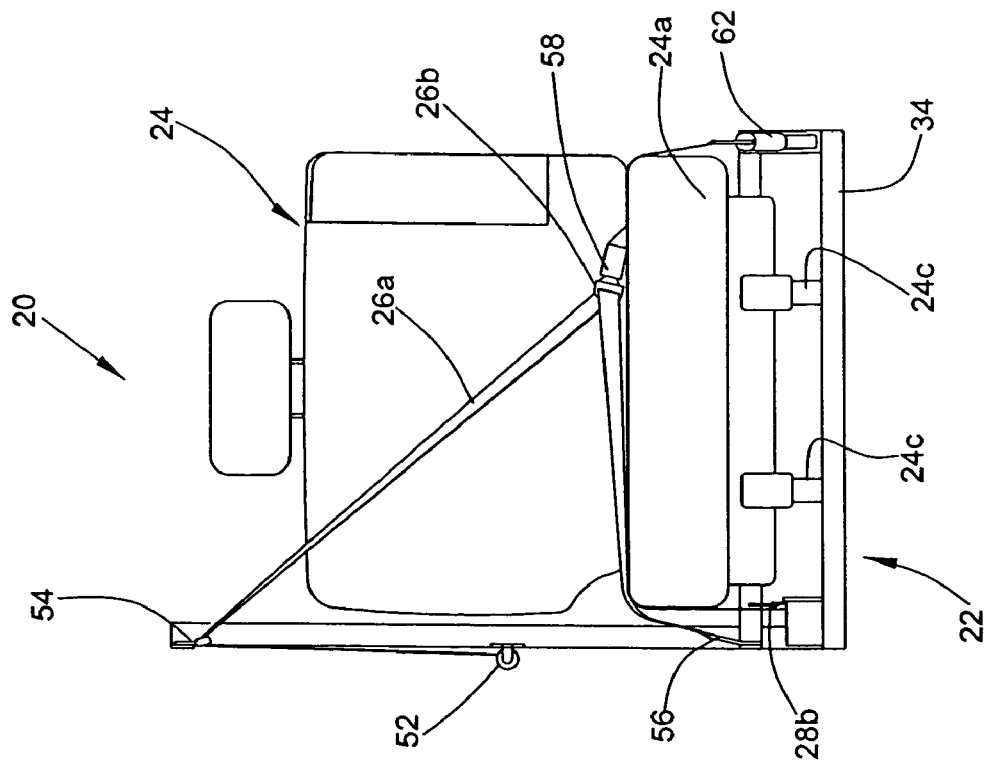
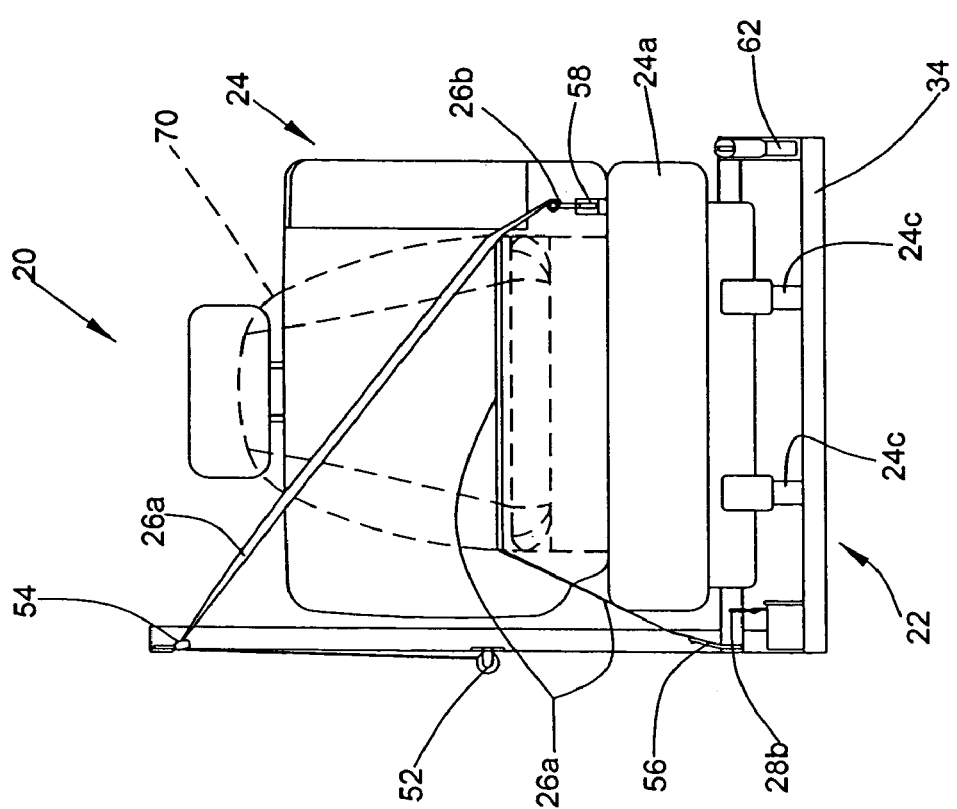

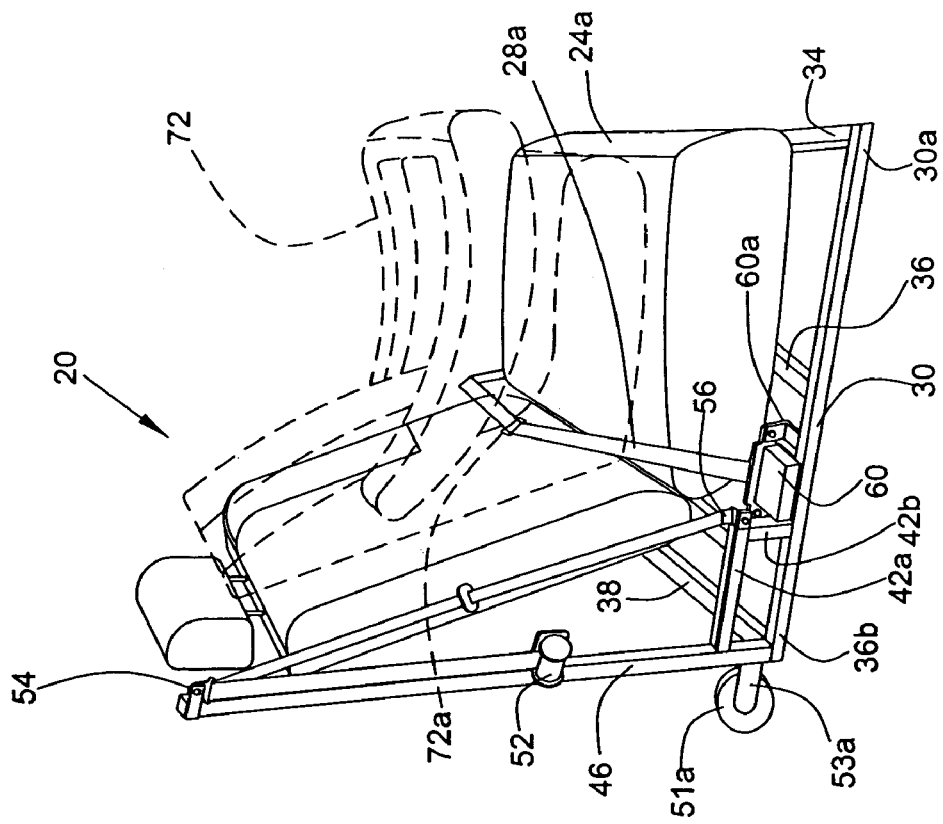
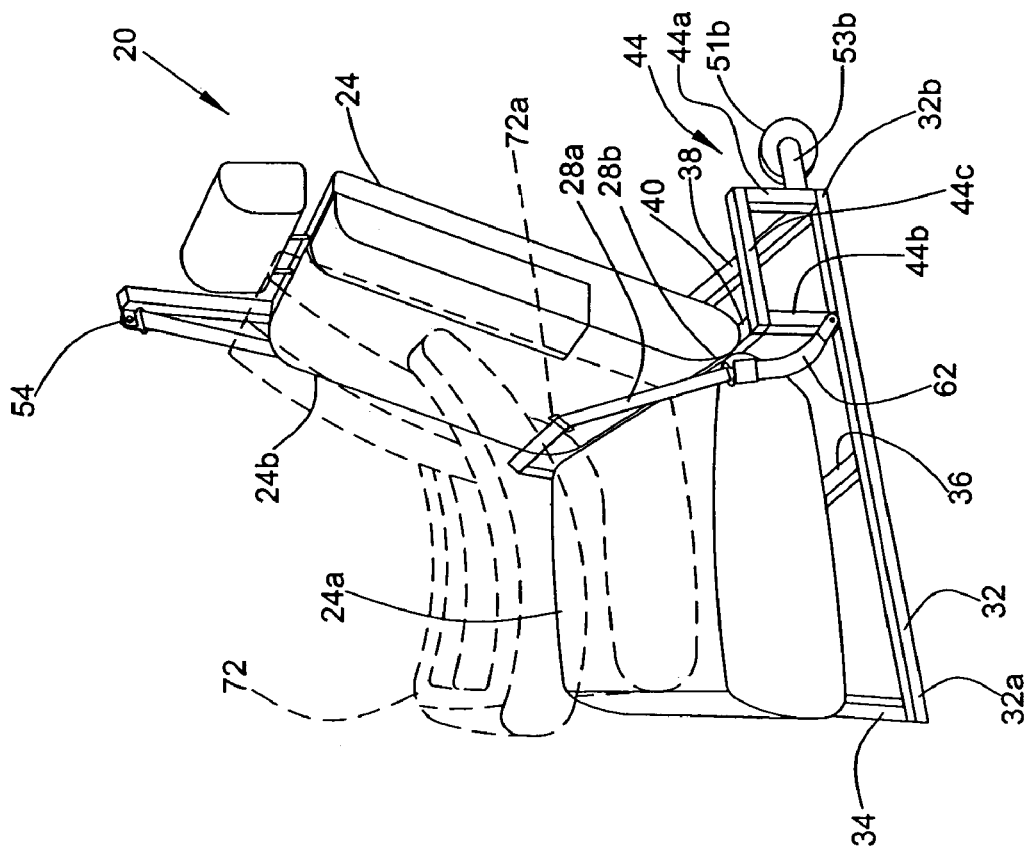
FIG. 6A
FIG. 6B

PORTABLE CHILD SEAT DEMONSTRATION DEVICE

BACKGROUND OF THE INVENTION

1. Field of the Invention

The present invention relates to vehicle seats and child seats adapted to be secured to a vehicle seat using seat belts or tethers, more particularly, toward a portable demonstration seat that is adapted to receive a variety of different child seats.

2. Description of Related Art

Over the years, several different types of child safety seats have been developed. Often, these different child seats have different methods of being secured to a host vehicle seat, despite the fact that attachment mechanisms within the seat of the vehicle, typically by a seat belt system provided by the vehicle. However, other methods of seat securement are possible, such as attaching tethers provided by the child seat to fixed anchorage points in the vehicle.

Unfortunately, as the number of different ways to secure child seats in vehicles has grown, so has the difficulty in educating new parents and others in the proper manner to install the child seat in the respective vehicle. Naturally, proper installation or securement of the child seat on the car seat is important for safety reasons. Therefore, there exists a need in the art for a seat that can be used to demonstrate proper positioning, installation, and securement of various child seats.

SUMMARY OF THE INVENTION

The present invention is directed toward a demonstration vehicle seat that can be used to demonstrate proper positioning, installation, and securement of various child safety seats. The present invention is further directed toward a demonstration seat assembly including a demonstration vehicle seat and a frame so as to be self supporting and portable.

In accordance with the present invention, a demonstration seat assembly includes a frame on which the demonstration vehicle seat is supported, and a plurality of seat belt assemblies and child seat securing structures. More specifically, the seat belt assemblies include a lap belt assembly, a combination lap and shoulder belt assembly (hereinafter referred to as a lap/shoulder belt assembly), and a plurality of anchorage points adapted to receive tethers and/or a fixed anchoring latch assembly extending from one or more types of child seats. The lap belt assembly includes a fixed or sewn latch plate or tongue, as well as an emergency locking retractor (ELR). The ELR is secured to the frame on a first side of the vehicle seat. The lap/shoulder belt assembly includes a sliding latch plate or tongue, as well as a switchable locking retractor. The switchable locking retractor is also secured to the frame on the first side of the vehicle seat. The anchorage points include first and second lateral anchorage points that are accessible on a front side of the vehicle seat at a location between the seat cushion and seat back, as well as a third or center anchorage point that is accessible at a rear side of the vehicle seat.

In further accordance with the present invention, the frame includes a base assembly to which a plurality of wheels are secured to permit the demonstration seat assembly to be conveniently transported. The frame also includes an upstanding post on the first side of the demonstration vehicle seat to which the lap/shoulder belt switchable locking retractor is secured. Further, the lap belt ELR is secured to the frame on the first side of the demonstration seat adjacent a fixed anchor for the lap/shoulder belt assembly. The receptacle or buckle for the seat belt assembly latch plate is secured to the frame at a second side of the vehicle seat, while the receptacle or buckle for the lap/shoulder belt assembly latch plate is provided by the seat.

BRIEF DESCRIPTION OF THE DRAWINGS

These and further features of the invention will be apparent with reference to the following description and drawings, wherein:

FIG. 2 is a perspective view of the demonstration seat assembly according to the present invention, with the lap belt assembly in a use position;

FIG. 4 is a front elevational view of the demonstration seat assembly, with the lap/shoulder assembly and the lap belt assembly in the use positions;

FIG. 5 is a front elevational view of the demonstration seat assembly with a child booster seat supported thereon and secured in place with the lap/shoulder belt assembly;

FIGS. 6A-6B are perspective views showing another type of child seat secured to the demonstration seat assembly with the lap belt assembly;

DETAILED DESCRIPTION OF THE PREFERRED EMBODIMENTS

Figure 1:
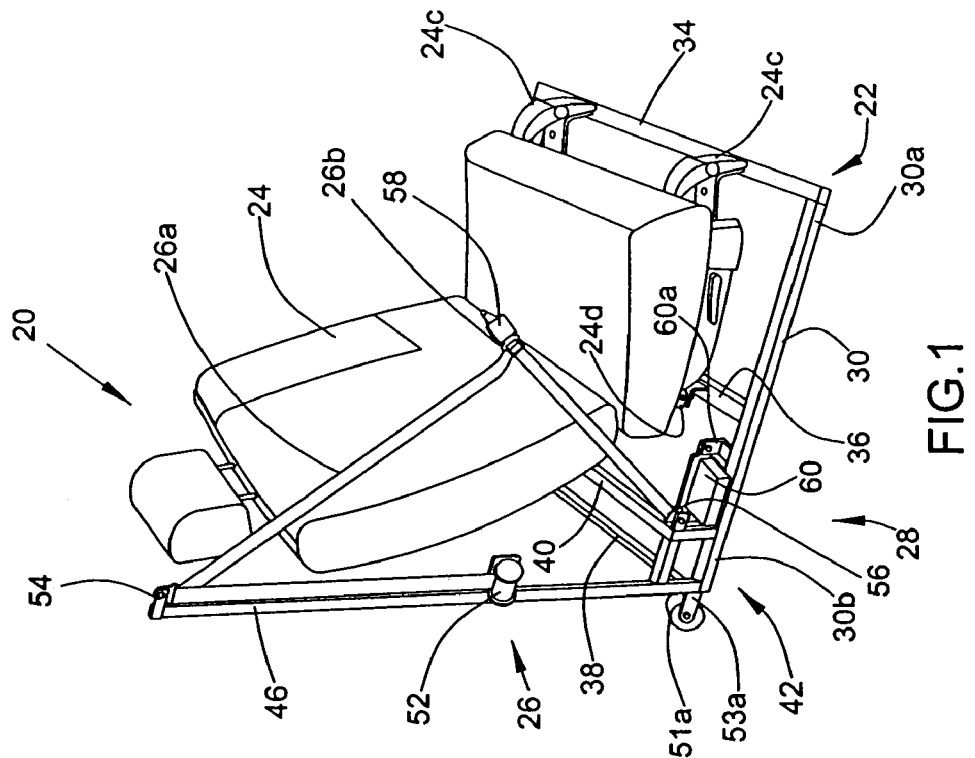
FIG. 1 is a perspective view of a demonstration seat assembly according to the present invention, with the lap/shoulder belt assembly in a use position.

With reference to FIGS. 1-4, the demonstration seat assembly 20 according to the present invention includes a frame 22 to which a demonstration vehicle seat 24, a lap/shoulder belt assembly 26, and a lap belt assembly 28 are mounted.

The frame 22 includes first and second lengthwise-extending support bars 30, 32, a plurality of transverse support bars 34, 36, 38, 40, a first lateral mounting assembly 42, a second lateral mounting assembly 44, and an upright support bar 46 that are preferably welded together or otherwise attached so as to form a solid, unitary structure. The first lengthwise-extending support bar 30 has a front end 30a and a rear end 30b, and is disposed on a first side of the demonstration vehicle seat 24. The second lengthwise-extending support bar 32 has a front end 32a and a rear end 32b and is disposed on a second side of the demonstration vehicle seat 24.

The transverse support bars include a front support bar 34, a rear support bar 36, an intermediate support bar 38, and a raised support bar 40. The front, rear, and intermediate support bars 34, 36, 38, like the lengthwise extending support bars 30, 32, are disposed on the floor and, as will be appreciated by those skilled in the art, cooperate to define a stable supporting base assembly for the demonstration seat assembly 24.

The front support bar 34 extends between and interconnects the front ends 30a, 32a of the first and second lengthwise-extending support bars 30, 32. The rear support bar 36 extends between and interconnects the rear ends 30b, 32b of the first and second lengthwise-extending support bars 30, 32. The intermediate support bar 38 extends between and interconnects the first and second lengthwise-extending support bars 30, 32 at a location generally midway along their length, as illustrated. The raised support bar 40 extends between and interconnects the first and second lateral mounting assemblies 42, 44, as will be described more fully hereinafter. Further, and as shown best in FIGS. 3 and 9, the raised support bar 40 integrally includes a plurality of anchors or anchorage points, including first and second lateral latch anchorage points 48, 49 that extend through the vehicle demonstration seat between the seat cushion 24a and the seat back 24b, and a center tether anchorage point 50. As will be apparent to those skilled in the art, the lateral latch anchorage points 48, 49 are generally inverted U-shaped projections that are adapted to receive either tethers or a fixed anchoring latch assembly from a child seat, whereas the center tether anchorage point 50 is adapted to receive a tether from the child seat that extends over a top of the vehicle seat.

The first lateral mounting assembly 42 is generally L-shaped and has a lengthwise extending arm 42a and a downwardly extending leg 42b. The arm 42a is connected to and extends forwardly from a lower end of the upright support bar 46 upwardly adjacent the intersection of the rear transverse support bar 36 and the first lengthwise-extending support bar 30. The leg 42b extends downwardly from the forward end of the arm 42a, and is attached to the first lengthwise extending support bar 30 at a location between the rear and intermediate transverse support bars 36, 38.

The second lateral mounting assembly 44 is generally of an inverted U-shape and has a first or rear leg 44a connected to and extending upwardly from the intersection of the rear transverse support bar 36 and the second lengthwise-extending support bar 32. A second or front leg 44b of the second lateral mounting assembly 44 is secured to the second lengthwise extending support bar 32 at a location between the rear and intermediate transverse support bars 36, 38. A lengthwise extending arm 44c of the second lateral mounting assembly 44 extends between and interconnects upper ends of the first and second legs 44a, 44b, as illustrated.

The raised support bar 40 extends between and interconnects the first and second lateral mounting assemblies 42, 44. More specifically, a first end 40a of the raised support bar 40 is attached to the first lateral support assembly 42 adjacent the intersection of the forwardly extending arm 42a and the downwardly extending leg 42b, while the second or opposite end 40b of the raised support bar 40 is attached to the second lateral support assembly 44 adjacent the intersection of the arm 44c and the second leg 40b thereof.

The upright support bar 46 has a lower end connected to the intersection of the first lengthwise-extending support bar 30 and the rear transverse support bar 36 and extends upwardly therefrom.

A first wheel 51a is rotatably mounted to the frame 22 on the first side of the demonstration vehicle seat 24. More specifically, the first wheel 51a is disposed adjacent the intersection of the upright support bar 46, the rear support bar 36, and the first lengthwise-extending support bar 30 via an extension 53a. Similarly, a second wheel 51b is rotatably mounted to the frame 22 on the second side of the demonstration vehicle seat, adjacent the intersection of the rear support bar 36 and the second lengthwise-extending support bar 32 via an extension 53b. The wheels 51a, 51 b permit the demonstration seat assembly 20 to be easily transported by tipping the assembly 20 back onto the wheels 51a, 51 b and then rolling the assembly across the floor.

The lap/shoulder belt assembly 26 includes a belt webbing 26a, a slidable latch plate 26b, a switchable retractor assembly 52, a swivel-type mount 54, a fixed swivel anchor 56, and a buckle 58.

The switchable retractor assembly 52 is affixed to the upright support bar 46 at a location generally midway along the length thereof. As will be appreciated by those skilled in the art, the switchable retractor assembly 52 is normally operable to permit the belt webbing 26a wrapped therearound to be freely paid-in and paid-out. However, when the belt webbing 26a is fully paid-out, and then slowly paid back into the switchable retractor assembly 52, the retractor assembly locks when the belt webbing 26a stops being paid-in, and subsequently serves as a fixed anchor for the belt webbing 26a until being released. Insofar as switchable retractor assemblies and their operation are well known to those skilled in the art of vehicle seat belt assemblies, the specific structure and operation of the switchable retractor assembly 52 will not be discussed further hereinafter.

The swivel-type mount 54 of the shoulder belt assembly 26 is secured to a top end of the upright support bar 46 so as to dispose the shoulder belt webbing 26a slidably extending therethrough in a vertical position similar to that found in a production vehicle. The slidable latch plate 26b is slidably disposed over the belt webbing 26a and is movable over the belt webbing 26a to a convenient location to permit the latch plate 26b to be inserted into the buckle 58. The fixed anchor 56 is attached to the first lateral mounting assembly 42 at a location adjacent the intersection of the arm 42a and the leg 42b, and is permanently attached to a free end of the belt webbing 26a. The buckle 58 is provided by the demonstration vehicle seat 24, as described hereinafter. As will be appreciated by those skilled in the art, when the lap/shoulder belt assembly 26 is properly used, it provides a fixed three-point connection between the belt webbing 26a and the demonstration seat assembly 20.

The lap belt assembly 28 includes a belt webbing 28a, a sewn or fixed latch plate 28b, an emergency locking retractor (ELR) assembly 60, and a buckle 62.

The ELR assembly 60 is secured via a subframe 60a to the first lengthwise-extending support bar 30 forwardly adjacent the first lateral mounting assembly 42. As is well known in the art, the ELR assembly 60 is operable to lock or hold the belt webbing 28a in the event of a rapid change in velocity indicative of a vehicle accident.

The fixed latch plate 28b is sewn to the free end of the belt webbing 28a. The buckle 62 is affixed to the second lateral support assembly 44 adjacent the intersection of the second or front leg 44b and the second lengthwise-extending support bar 32 and extends upwardly therefrom to a position substantially even with the upper surface of the seat cushion 24a.

The demonstration vehicle seat 24 is preferably attached to the frame 22 at its front and rear ends. More specifically, front mounts 24c extend between the demonstration vehicle seat 24 and the front transverse support bar 34 while rear mounts 24d extend between and interconnect the demonstration vehicle seat 24 to the intermediate transverse support bar 36. Preferably, the seat 24 is fixed in position relative to the frame 22 (i.e., is not slidably mounted via rails). However, the seat 24 is otherwise fully functional, including a tilt adjustment so as to adjust the angle of the seat back 24b relative to the seat cushion 24a.

As noted previously, the demonstration vehicle seat 24 provides the buckle 58 of the lap/shoulder belt assembly 26. Further, the first and second lateral latch anchorage points 48, 49 are accessible from a front of the demonstration vehicle seat 24 between the seat back 24b and the seat cushion 24a.

As described to this point, the demonstration seat assembly 20 provides a single demonstration vehicle seat 24 having attachment devices (including the lap/shoulder belt assembly 26, lap belt assembly 28, and latch anchorage points 48 49, 50) that replicate the great majority of attachment devices or attachment options used to secure a child seat to a vehicle seat. This permits an instructor to demonstrate how to properly secure a child seat to a vehicle seat using only one piece of equipment, which greatly eases the burdens on the instructor and facilitates comprehension by the audience. Moreover, by mounting the demonstration vehicle seat 24 to the frame 22 instead of a vehicle seat that is disposed within a vehicle, the demonstration vehicle seat 24 is accessible on all sides, which eases placement of child seats thereon and demonstration of proper attachment procedures. Further, the frame 22 permits the demonstration vehicle seat to be easily transported to and from a demonstration site by tipping the demonstration seat assembly 20 rearwardly onto the wheels 51a, 51b and then pushing/pulling the assembly 20 to the desired location.

With reference to FIGS. 3 and 5-9, the demonstration seat assembly 20 according to the present invention is shown being used with several different child seats to illustrate the assembly's adaptability and usefulness for demonstration or instruction purposes. It is considered apparent that these child seats are merely representative of those available commercially, and that the present invention is not limited to use therewith. Moreover, the following description of the installation procedure is rather general in nature, and is not intended to replace the more detailed instructions that the demonstrator or child seat manufacturer would provide to the end user. In this regard it is noted that adjustment of the angle of the seat back 24b relative to the seat cushion 24a may be an important installation consideration for some of the child seats, and the demonstration seat assembly 20 of the present invention readily permits such angular adjustment of the seat back 24b.

With reference to FIG. 5, a first type of child seat 70 is shown disposed upon the demonstration seat assembly 20. The child seat 70 is attached to the demonstration vehicle seat 24 with the lap/shoulder belt assembly 26 by extending the belt webbing 26a across the child seat and inserting the associated sliding latch plate 26b into the buckle 58. As such, upper and lower portions of the belt webbing 26a extend diagonally across the child seat 70 to secure the child seat 70 and the child (not shown) in place. Such a child seat 70 is sometimes referred to as a booster seat, and is typically used with older or larger children so as to place the child in a vertical position generally corresponding to that of an adult, and in which the lap/shoulder belt assembly 26 is more effective as a restraint. As is known in the art, the child seat 70 may include one or more guides at upper and lower ends of the lateral sides thereof to assist in properly positioning the belt webbing 26a such that the belt webbing falls diagonally across the child's torso from the collar bone to the opposite hip bone, which is the optimal placement.

Figure 7B:
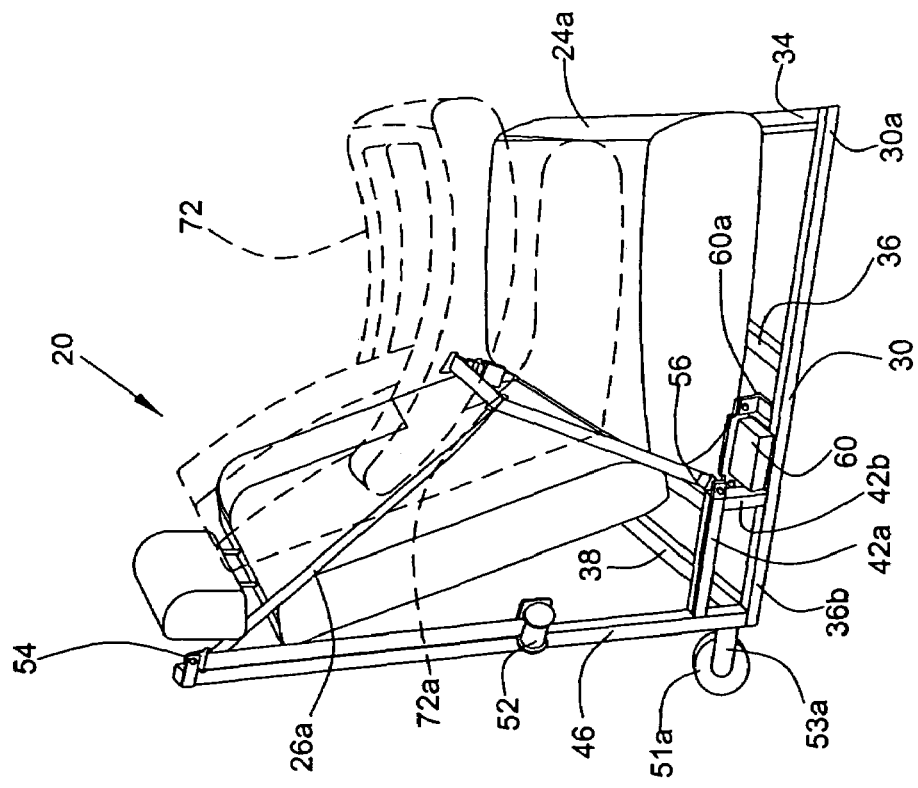
FIGS. 7A-7B are perspective views showing the child seat of FIGS. 6A-6B secured to the demonstration seat assembly with the lap/shoulder belt assembly.
Figure 7A:
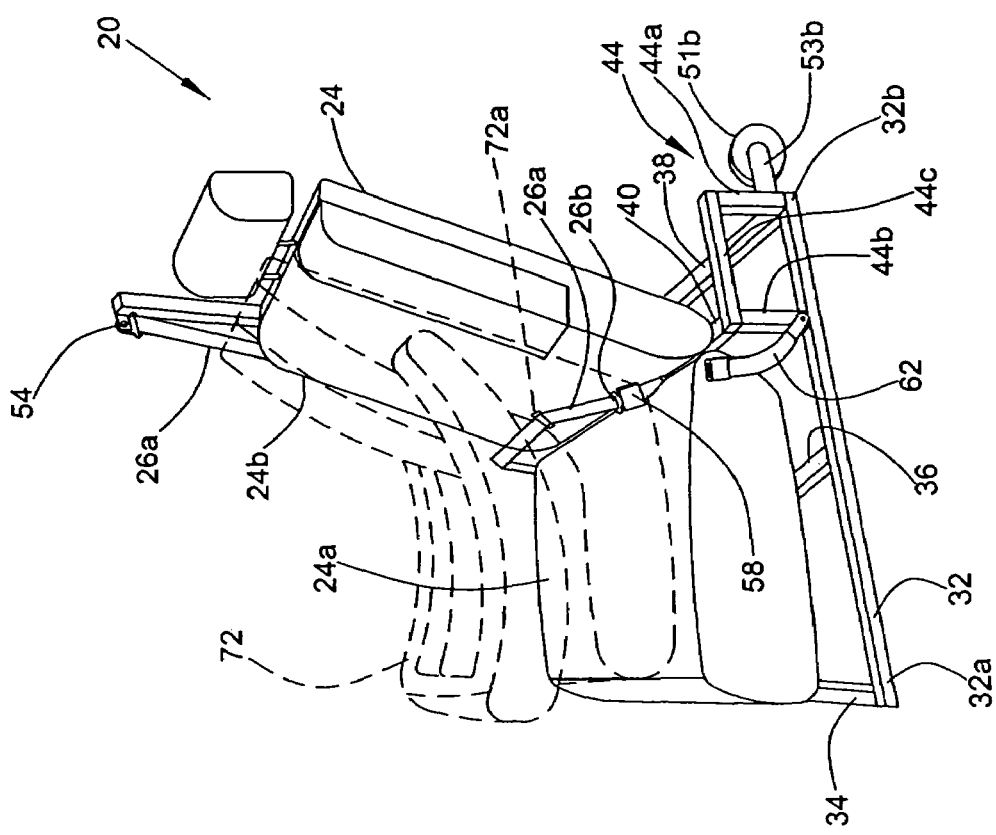

With reference to FIGS. 6A-6B, a second type of child seat 72 is disposed upon the demonstration seat assembly 20, and is attached to the vehicle seat 24 with the lap belt assembly 28 by extending the lap belt webbing 28a through one or more passageways 72a formed in a rear of the child seat 72 and inserting the associated fixed latch plate 28b into the buckle 62. FIGS. 7A-7B show a similar arrangement in which the lap/shoulder belt assembly 26 is used to secure the child seat 72 by extending the belt webbing 26a through the passageways 72a and inserting the slidable latch plate 26b into the buckle 58.

Figures 8A, 8B:
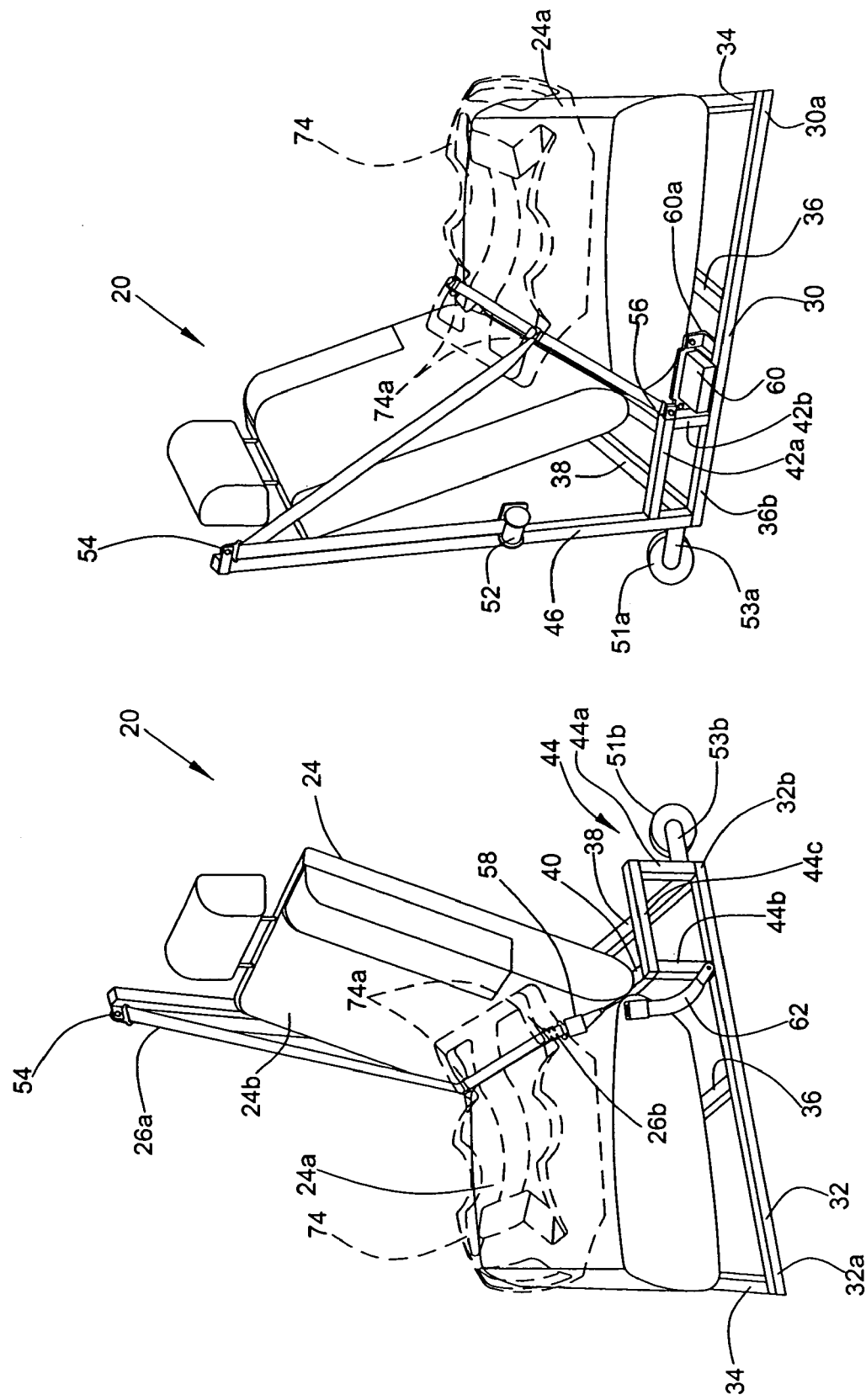
FIGS. 8A-8B are perspective views showing a child seat mounting platform or base secured to the demonstration seat assembly with the lap/shoulder belt assembly; and, FIG. 9 is a perspective view illustrating attachment of a child seat using tethers that are secured to fixed anchorage points provided by the demonstration seat assembly according to the present invention.

FIGS. 8A-8B illustrate attachment of a child seat platform or base 74, which is used with a removable baby carrier (not shown), to the demonstration seat assembly 20, using the lap/shoulder belt assembly 26. The seat base 74 includes a pair of slotted openings 74a that receive spaced apart portions of the belt webbing 26a, and the slidable latch plate 26b is received by the buckle 58 to secure the base 74 in place on the demonstration vehicle seat 24.

Figure 3:
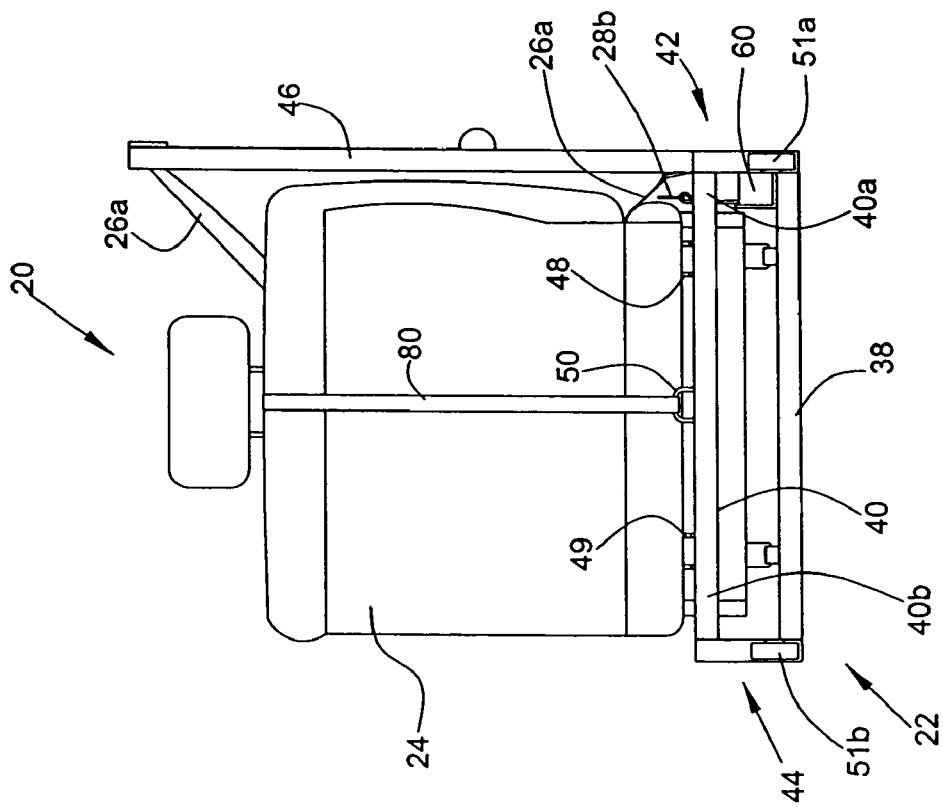
FIG. 3 is a rear elevational view of the demonstration seat assembly according to the present invention, with the lap/shoulder belt assembly in the use position and illustrating connection of a tether to an associated center anchorage point.

FIGS. 3 and 9 illustrate a further child seat 76 that is attached to the demonstration seat assembly using a series of tethers 78, 80. More specifically, a first tether 78 having first and second ends 78a, 78b extends through a passageway formed in the rear of the child seat 76 and is attached to the first and second lateral latch anchorage points 48, 49, respectively, which are accessible between the seat cushion 24a and the seat back 24b, as described previously. A second tether 80 extends upwardly from a rear of the child seat 76 and is secured to the center tether anchorage point 50 provided on the raised support bar 40. Preferably, the tethers 78, 80 include hooks or other attachment devices to facilitate securement to the anchorage points 48, 49, 50, and include cinching devices to permit the operative length of the tethers 78, 80 to be shortened so as to tighten the tethers and more securely attach the child seat 76 to the demonstration vehicle seat 24. Alternatively, instead of the first tether 78, a fixed or rigid anchoring latch assembly that releasably snaps onto the lateral latch anchorage points 48, 49 may be used.

While the preferred embodiment of the present invention has been described hereinbefore, the present invention is not limited thereto. Rather, it is considered apparent that the present invention is capable of numerous modifications, rearrangements, and substitutions of parts and, accordingly; the scope of the present invention is only to be defined by the claims appended hereto.

What is claimed is:

1. A demonstration seat assembly for use in demonstrating proper securement of a child seat to a vehicle seat, comprising:
   a demonstration vehicle seat comprising a seat back and a seat cushion;
   a frame including a base to which said demonstration vehicle seat is mounted and an upstanding support bar that extends upwardly from said base;
   a combination lap and shoulder belt assembly secured to said upstanding support bar;
   a lap belt assembly secured to said frame base; and,
   wheels rotatably mounted to said frame, and wherein said demonstration seat assembly is portable.

2. The demonstration seat assembly according to claim 1, wherein said frame includes a plurality of anchorage points.

3. The demonstration seat assembly according to claim 2, wherein at least one of said anchorage points is accessible on a forward side of said demonstration vehicle seat.

4. The demonstration seat assembly according to claim 1, wherein said demonstration seat assembly has a first side and a second side, and the upstanding support bar is disposed on the first side of said demonstration vehicle seat.

5. The demonstration seat assembly according to claim 4, wherein said combination lap and shoulder belt assembly further comprises a belt webbing, a switchable locking retractor assembly, a fixed anchor, a sliding latch plate, and a buckle, said switchable locking retractor assembly being mounted on said upstanding support bar, said belt webbing extending from said switchable locking retractor assembly to said fixed anchor, said fixed anchor being attached to said frame at said first side of said demonstration seat assembly, said sliding latch plate being slidable along said belt webbing, and said buckle being provided by said demonstration vehicle seat adjacent said second side of said demonstration seat assembly.

6. The demonstration seat assembly according to claim 5, wherein said lap belt assembly further comprises a lap belt webbing, an emergency locking retractor assembly, a fixed latch plate, and a buckle, said emergency locking retractor assembly being mounted to said frame on said first side of said demonstration vehicle seat assembly, said lap belt webbing extending from said emergency locking retractor assembly to said fixed latch plate, said fixed latch plate being attached to a free end of said lap belt webbing, and said buckle being mounted to said frame at said second side of said demonstration seat assembly.

7. The demonstration seat assembly according to claim 6, wherein said frame includes a plurality of anchorage points.

8. The demonstration seat assembly according to claim 7, wherein at least one of said anchorage points is accessible on a forward side of said demonstration vehicle seat.

9. The demonstration seat assembly according to claim 4, wherein said lap belt assembly further comprises a lap belt webbing, an emergency locking retractor assembly, a fixed latch plate, and a buckle, said emergency locking retractor assembly being mounted to said frame on said first side of said demonstration vehicle seat assembly, said lap belt webbing extending from said emergency locking retractor assembly to said fixed latch plate, said fixed latch plate being attached to a free end of said lap belt webbing, and said buckle being mounted to said frame at said second side of said demonstration seat assembly.

10. A method for using a demonstration seat assembly for properly securing a child seat to a demonstration vehicle seat, comprising the steps of:
   providing said demonstration seat assembly, comprising:
      the demonstration vehicle seat including a seat back and a seat cushion;
      a frame including a base to which said demonstration vehicle seat is mounted and an upstanding support bar that extends upwardly from said base;
      a combination lap and shoulder belt assembly secured to said upstanding support bar;
      a lap belt assembly secured to said frame base; and,
      wheels rotatably mounted to said frame, and wherein said demonstration seat is portable;
   placing a child seat on said demonstration vehicle seat cushion;
   selecting one of said combination lap and shoulder belt assembly and said lap belt assembly to be used to secure the child seat to the demonstration vehicle seat; and,
   extending a belt webbing of said selected one of said combination lap and shoulder belt assembly and said lap belt assembly from a first side of said demonstration seat assembly, over said child seat, and inserting a latch plate associated with said belt webbing into an accommodating buckle disposed on a second side of said demonstration seat assembly.

* * * * *